CAN FOR STORING MOTION PICTURE FILM AND MAGNETIC TAPE
Filed May 31, 1966
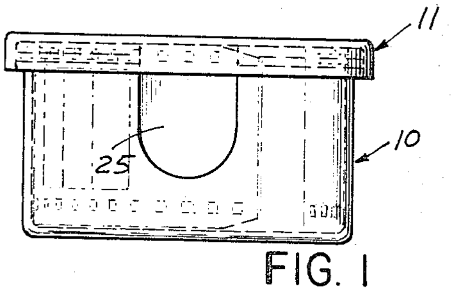
FIG. 1
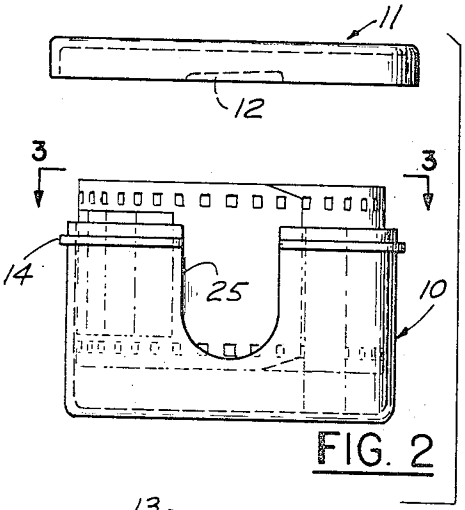
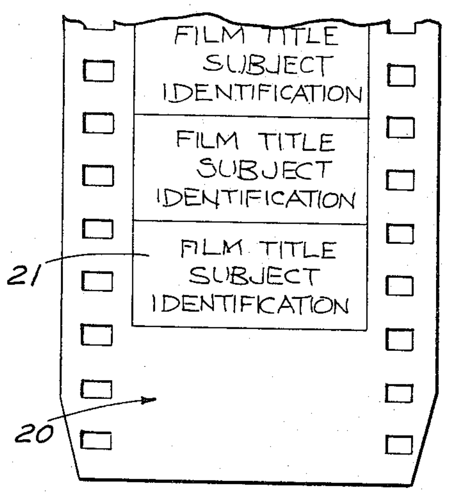
FIG. 4
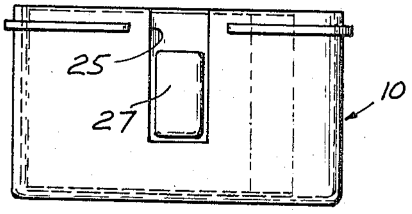
FIG. 5
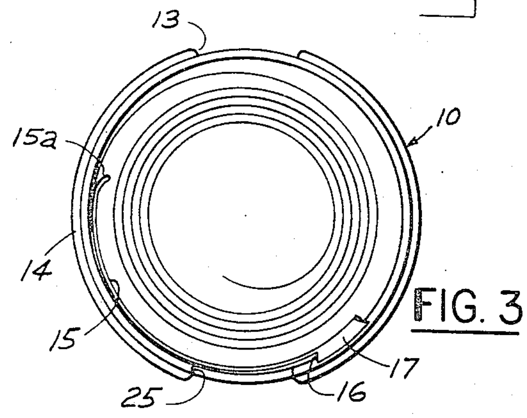
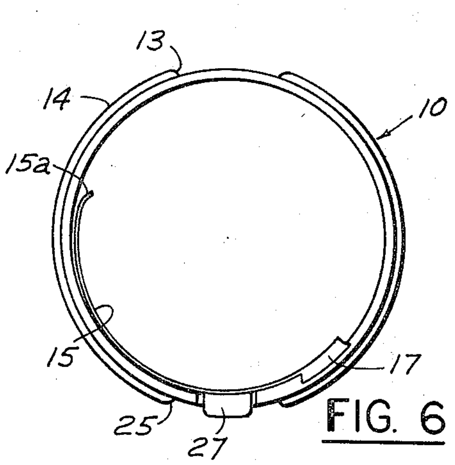
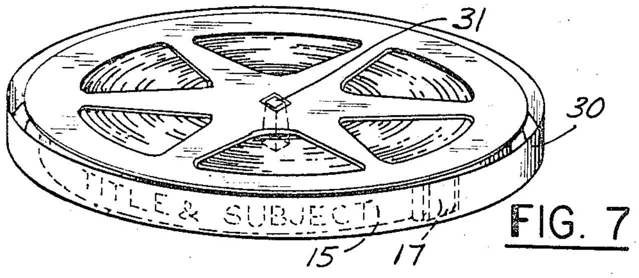
FIG. 7
INVENTORS
MORRIS SCHWARTZ
WERNER K. BENDER
BY Hane and Nydick
ATTORNEYS

3,335,851
CAN FOR STORING MOTION PICTURE FILM AND MAGNETIC TAPE

Morris Schwartz and Werner K. Bender, Plainville, Conn., assignors to The Kalart Company Inc., Plainville, Conn., a corporation of New York Filed May 31, 1966, Ser. No. 554,180
10 Claims. (Cl. 206—52)

The present invention relates to cans as are widely used for storing motion picture film and also reels for magnetic tape such as computer tape.

Cans of this type are generally made of plastic or metal and have a detachable cover for inserting and removing the film or the tape from the can. The cover is used to identify the contents of the can by applying a label to the top surface of the cover. Practical experience shows that not infrequently the cover of one can is applied to another can thereby mislabeling both cans which may result in considerable inconvenience and embarrassment. The relabeling of a can is also easily forgotten when the contents thereof are changed. Moreover, relabeling of a can is rather troublesome.

It is an object of the present invention to provide a novel and improved type can of the general kind above referred to the contents of which can be easily and accurately identified from the outside of the can without removing the cover.

Another object of the invention is to provide a can of the general kind above referred to the contents of which can be identified without requiring labeling of the cover and application of a correctly labeled cover to the can.

Still another object is to provide a novel and improved can of the general kind above referred to which is self-labeling in that a labeled leader secured directly to the film or tape to be stored in the can is visible from the outside thereof without opening the can thus making the same practically foolproof as to its contents.

A further object of the invention is to provide a novel and improved can of the general kind above referred to in which the labeled leader of the film or the tape is retained in the can in the correct position for identification but can be conveniently withdrawn from such retained position when the film or tape is to be used.

Other and further objects, features and advantages of the invention will be pointed out hereinafter and set forth in the appended claims constituting part of the application.

In the accompanying drawing several preferred embodiments of the invention are shown by way of illustration and not by way of limitation.

In the drawing:

FIG. 1 is an elevational side view of a can according to the invention for storing motion picture film;

FIG. 2 is an exploded view of the can according to FIG. 1;

FIG. 3 is a plan view of FIG. 2 taken on line 3—3 thereof;

FIG. 4 is a fragmentary view of the labeled leader of motion picture film;

FIG. 5 is a modification of the can, the cover of the can being omitted;

FIG. 6 is a plan view of FIG. 5; and

FIG. 7 is a perspective view of a can according to the invention as used for storing a tape reel.

Referring now to the figures more in detail and particularly to FIGS. 1 through 4, the can exemplified in these figures comprises a generally cylindrical base 10 and a cover 11. Both the base and the cover are preferably made of a suitable plastic material. At least part of the side wall of base 10 must be transparent for a reason which will be more fully explained hereinafter. The remainder of the side wall and also the cover may be transparent or opaque. Cover 11 is suitably fitted upon the base. It may be releasably secured thereto, for instance by means of a bayonet lock indicated by a nose or lip 12 in the cover and a cut-out 13 in a circumferential flange 14 on the base.

A tongue 15 made of a suitable preferably flexible material is secured to the inside wall of base 10 along an edge extending in the can in axial direction. The tongue edge may be permanently secured to the base 10 for instance by means of a suitable adhesive, or it may be detachably secured to the base for instance by providing on the inside of the side wall a keyed groove 16 into which is suitably fitted a correspondingly shaped mounting end 17 on tongue 15. The free portion of the tongue extends circumferentially along the side wall and is preferably biased toward the same. To facilitate insertion of the film between the side wall and the tongue, the latter preferably ends in a bent-off lip 15*a*. The tongue is advantageously made of an opaque material, or has at least an opaque surface on its side facing the side wall.

Motion picture film such as film 20 shown in FIG. 4 is stored in the can by inserting the film so that its leader 21, bearing a film title or other information in a conventional manner, is fitted between the tongue and the adjacent transparent side wall portion of the can. The can may then be closed by applying the cover 11 thereto.

As is evident, the film title placed between the tongue and the side wall of the base can be conveniently read from the outside of the can. Replacement of the film by a differently titled one will, in effect, automatically remove the label of the first film and relabel the can with the title of the second film.

To facilitate insertion of the film leader between the wall of the base and the tongue, a cut-out 25 in the side wall of base 10 is preferably provided. Finger pressure can be conveniently exerted through the cut-out to push the tongue away from the side wall to the desired extent.

The can according to FIGS. 5 and 6 is very similar to the previously described can except that a projection or lug 27 protrudes from tongue 15 through cut-out 25. Pressure against this projection will force the tongue inwardly. The length of the tongue must, of course, be so selected that there is sufficient space for the leader between projection 27 and the free end of the tongue.

The can of FIG. 7 is very similar in principle to the previously described cans and has a base part 30 made completely or at least partly of transparent material. The base can be covered by a suitable lid which is not shown to simplify the illustration. A tape reel or a film reel such as a reel for a 400 feet 16 mm. film, is inserted in the can. A tapered square pip preferably extends from the bottom of base 30 to lock the reel inserted into the can against rotation within the same. The side wall of base 30 has secured thereto a tongue 15 as previously described. A leader identifying the tape and suitably attached thereto is then placed between the tongue and the base wall so that the message on the leader can be conveniently read from the outside of the can thereby unmistakably identifying the contents of the can.

As the leader of film or tape is usually transparent and the message is usually in black print, the surface of the tongue facing outwardly is preferably white so that there is a strong contrast between the message and the background.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A storage device for storing motion picture film or magnetic tape, said device comprising a can having a side wall and loosely fittable upon the can cover, and a tongue secured at one end to the inside of said side wall and peripherally extending within said can closely adjacent to the inside of said side wall thereof, at least the portion of the side wall juxtaposed to said tongue being transparent.

2. A storage device according to claim 1 wherein said tongue is biased toward said side wall.

3. A storage device according to claim 1 and comprising mounting means for detachably securing said tongue edge to said side wall.

4. A storage device according to claim 1 wherein said side wall is made of a transparent plastic and said tongue is made of an opaque elastic material.

5. A storage device according to claim 1 wherein said side wall includes an opening adjacent to said tongue for exerting an inwardly directed pressure upon the tongue from the outside of the can to bend the tongue away from said side wall.

6. A storage device according to claim 1 wherein said side wall includes an opening adjacent to said tongue, and wherein said tongue has a protrusion extending through said side wall opening for exerting an inwardly directed pressure upon the tongue to bend the same away from the side wall.

7. A storage device according to claim 1 wherein said tongue is secured to the side wall crosswise of the peripheral direction of said wall and the tongue extends lengthwise of said peripheral direction.

8. A storage device according to claim 7 wherein said side wall of the can is cylindrical and said tongue edge is secured to the side wall in axial direction.

9. In combination: a storage device as defined in claim 1, and a motion picture film or magnetic tape having a leader bearing a message attached to one end, said leader being insertable between the inside of said side wall and said tongue thereby making visible the message on the leader from the outside of the can.

10. A combination according to claim 9 wherein said tongue is made of opaque material.

References Cited

UNITED STATES PATENTS 3,004,658 10/1961 Rehklau ---------------- 206—52

FOREIGN PATENTS 678,238 12/1929 France.

THERON E. CONDON, *Primary Examiner.*

J. M. CASKIE, *Assistant Examiner.*